United States Patent
Conti et al.

[11] Patent Number: 6,089,170
[45] Date of Patent: Jul. 18, 2000

[54] APPARATUS AND METHOD FOR LOW-NOX GAS COMBUSTION

[75] Inventors: Anthony V. Conti, Lake Mohegan, N.Y.; Anthony Facchiano, San Carlos; Dan V. Giovanni, Berkeley, both of Calif.; James Lucente, New City, N.Y.; Michael W. McElroy, Los Atlos, Calif.

[73] Assignee: Electric Power Research Institute, Inc., Palo Alto, Calif.

[21] Appl. No.: 09/215,602

[22] Filed: Dec. 17, 1998

Related U.S. Application Data

[60] Provisional application No. 60/068,164, Dec. 18, 1997.

[51] Int. Cl.$^7$ .................................. F23C 1/00; F23C 1/12
[52] U.S. Cl. ..................... 110/262; 110/263; 110/347; 431/8; 431/183; 431/187; 431/186; 431/189; 278/279; 278/284
[58] Field of Search .................... 431/8, 9, 181, 431/182, 183, 185, 186, 187, 189, 278, 279, 284, 285; 110/104 B, 260, 261, 262, 263, 264, 347

[56] References Cited

U.S. PATENT DOCUMENTS

| | | |
|---|---|---|
| 1,946,791 | 2/1934 | Hagan . |
| 4,618,323 | 10/1986 | Mansour . |
| 4,807,541 | 2/1989 | Masai et al. . |
| 4,925,387 | 5/1990 | Locanetto . |
| 5,044,932 | 9/1991 | Martin et al. . |
| 5,240,410 | 8/1993 | Yang et al. . |
| 5,257,927 | 11/1993 | Lang . |
| 5,269,678 | 12/1993 | Schwartz et al. . |
| 5,403,181 | 4/1995 | Tanaka et al. . |
| 5,829,369 | 11/1998 | Sivy et al. . |
| 5,842,849 | 12/1998 | Huang . |
| 5,863,192 | 1/1999 | Motegi .................... 431/8 |

*Primary Examiner*—Ira S. Lazarus
*Assistant Examiner*—Ljiljana V. Ciric
*Attorney, Agent, or Firm*—William S. Galliani; Pennie & Edmonds LLP

[57] ABSTRACT

A low NOx gas combustor includes an air injection mechanism to create a combustion air path. A set of arc-shaped gas injector arrays are formed in an annular configuration. Each arc-shaped gas injector array injects an arc-shaped stream of gas that intersects with the combustion air path to produce a fuel rich flame segment that is separated from an adjacent fuel rich flame segment from an adjacent arc-shaped gas injector array by an air rich zone. The interaction between the fuel rich flame segment and the air rich zone results in low NOx combustion of the gas.

15 Claims, 7 Drawing Sheets

APPARATUS AND METHOD FOR LOW-NOX GAS COMBUSTION

This invention claims priority to the provisional patent application entitled, "Apparatus and Method for Low-NOx Gas Combustion", Ser. No. 60/068,164, filed Dec. 18, 1997.

BRIEF DESCRIPTION OF THE INVENTION

This invention relates generally to combusting gas. More particularly, this invention relates to a gas combustion technique that produces relatively low amounts of NOx.

BACKGROUND OF THE INVENTION

In recent years the availability, competitive price, and clean burning characteristics of natural gas have made it an attractive fuel for electric power production. Consequently, utility companies have been increasing the capacity factors on existing gas-fired boilers and are adding gas-firing capability to boilers that were originally designed exclusively for oil or coal. During this same time period, the need to control NOx emissions from existing utility and industrial boilers has increased.

Gaseous fuels are burned in boilers, furnaces, and other enclosed furnace chambers. Typically, burning of the fuel occurs as it is mixed with air at one or more burners (e.g., combustors) located in the walls of the furnace chamber. The design of the burner affects the way in which the air and fuel are mixed, which in turn affects the characteristics of the burning process and combustion by-products. Oxides of nitrogen (NOx) are such by-products, and are regulated air pollutants that must be minimized. Various approaches are commercially applied to reduce NOx emissions, including complete replacement of the burners with low-NOx burners, recycling of flue gas to the burner, or other costly physical or operational changes to the boiler or furnace.

It would be highly desirable to provide a retrofittable gas burning technology that achieves NOx reductions at a fraction of the cost and complexity of new burners, Flue Gas Recirculation fans, and postcombustion processes.

SUMMARY OF THE INVENTION

A low NOx gas combustor includes an air injection mechanism to create a combustion air path. A set of arc-shaped gas injector arrays are formed in an annular configuration. Each arc-shaped gas injector array injects an arc-shaped stream of gas that intersects with the combustion air path to produce a fuel rich flame segment that is separated from an adjacent fuel rich flame segment from an adjacent arc-shaped gas injector array by an air rich zone. The interaction between the fuel rich flame segment and the air rich zone results in low NOx combustion of the gas.

A method of the invention includes the step of creating a combustion air path at a combustion point. An arc-shaped stream of gas is then injected at the combustion point to intersect with the combustion air path. This produces a fuel rich flame segment that is bordered by air rich zones. The interaction between the fuel rich flame segment and said air rich zones results in low NOx combustion of the gas.

An important feature of the invention is a segmented gas flame produced by a non-uniform injection of gas around the periphery of the flame stabilizer. The resulting gas jets in combination with the aerodynamic flow field produced by the burner air register and flame stabilizer produce an internally-staged, low-NOx flame that is stable with or without the use of Flue Gas Recirculation (FGR).

The technique of the invention is complementary to forced or Induced Flue Gas Recirculation (IFGR). Advantageously, the NOx reduction effects of the apparatus of the invention and Flue Gas Recirculation are multiplicative. The apparatus of the invention combined with 10% FGR achieves NOx reductions of 80% or more.

The apparatus of the invention can be installed on coal-fired boilers as part of gas-conversions or to upgrade existing gas-firing equipment. The cost of the apparatus of the invention is substantially below that of low-NOx burners, conventional Flue Gas Recirculation, and postcombustion NOx controls.

Advantageously, the invention is applicable to most boilers and furnaces equipped with circular burners that are designed to burn pulverized coal, oil, or gas. The invention is also adaptable to other boiler or furnace designs in which burners other than circular types are used. The invention can be installed into existing burners, while retaining major burner components, thereby minimizing installation costs.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
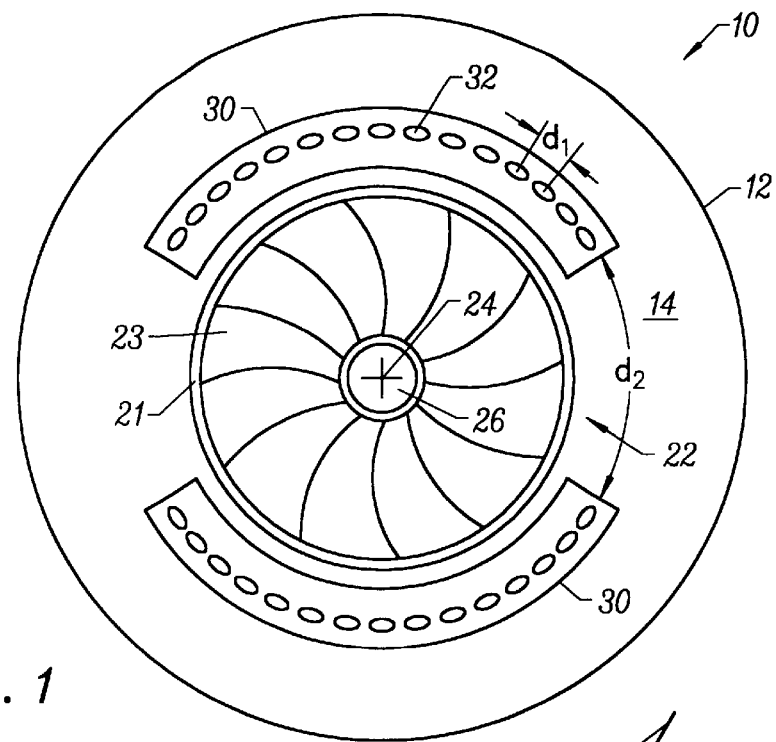
FIG. 1 is a front, axial view of a low NOx combustion apparatus in accordance with an embodiment of the invention.

FIG. 1 is a front, axial view of a combustor 10 constructed in accordance with an embodiment of the invention. The combustor 10 includes an air injection mechanism. In this embodiment of the invention, the air injection mechanism includes a circular burner lip 12 defining an annular air passage 14, through which approximately 90% of the combustion air flows. The remaining combustion air passes through a swirler 22. The swirler 22 also operates as a flame stabilizer. The swirler 22 includes a set of blades 23 and an outside shroud 21. The swirler 22 is mounted on a central burner axis 24, which preferably has an opening 26 for oil injection or supplemental gas injection.

FIG. 1 also illustrates a set of arc-shaped gas injector arrays 30 which are separated by a distance d2. The gas injector arrays 30 are positioned between the circular burner lip 12 and and the outside shroud 21. The gas injector arrays 30 may also be located on a circumference whose radius is less than the radius of the swirler shroud 21, provided that: (a) the gas injector arrays 30 are located behind or upstream of the swirler 22, and (b) the discharge angle 36 of the gas (shown in FIG. 2) is sufficient to prevent the gas from impinging on the swirler 22. There are preferably two gas injector arrays 30, which may be shaped as arc segments, preferably each extending between 90 and 150 degrees, preferably approximately 120 degrees of the circumference of the combustor 10.

In prior art devices, four to sixteen individual gas injectors are positioned within the swirler 22, or are uniformly distributed in the annular air passage 14. These prior art configurations do not create the segmented fuel rich zones and resultant performance benefits achieved with the invention, as discussed below.

Figure 3:
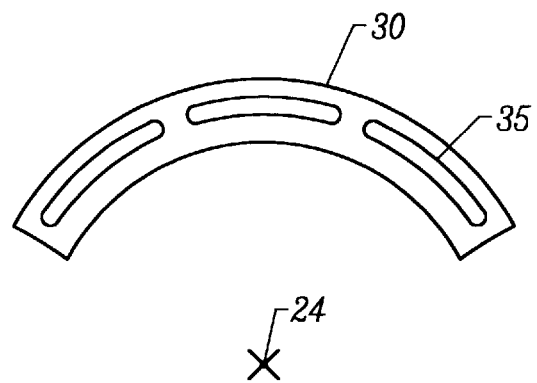
FIG. 3 is a simplified axial view of the apparatus of FIG. 1 with slotted gas injectors.

In FIG. 1, the injector arrays 30 have individual circular gas injector orifices 32, which are separated by a distance d1. Observe that the distance d2 is substantially greater than the distance d1. FIG. 3 illustrates an alternate embodiment of the invention with individual slotted gas injector orifices 35.

Figure 2:
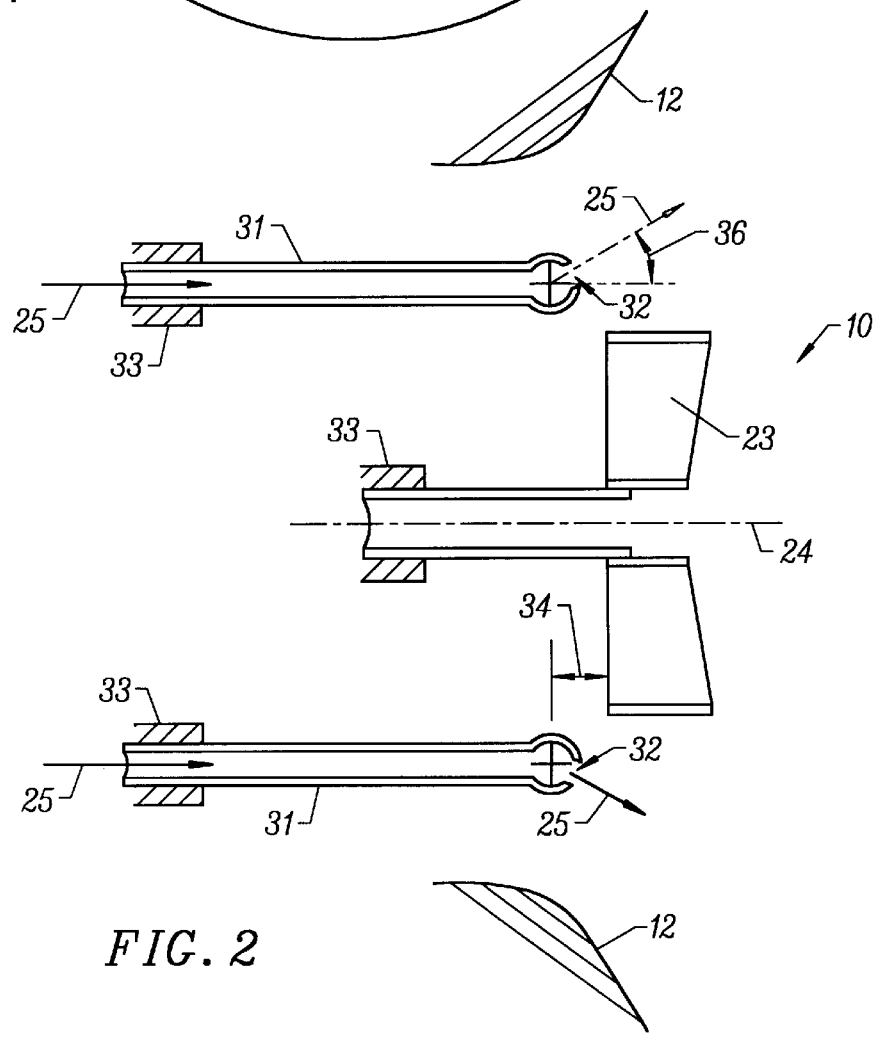
FIG. 2 is a side, cross-sectional view of the apparatus of FIG. 1.

FIG. 2 is a side view of the combustor 10, showing the swirler blades 23 and individual gas injectors 31 with circular gas injector orifices 32. Gas, as shown with arrows 25, is fed to each gas injector 31 under pressure through a source outside the combustor 10. The gas injectors 31 are separated from the swirler by an axial distance 34 that is optimized for mixing of fuel and air. Preferably, a capability is provided for adjusting this axial distance 34 by independently moving the swirler 22 and/or the individual gas injectors 31, for example, by mounting the gas injectors 31 through sleeves 33, which are locked in place after the optimal position is established.

As previously indicated, the gas injector arrays 30 contain circular gas injector orifices 32 or slotted gas injector orifices 35 through which the gas is injected. The holes or slots are aimed to direct the gas at an angle 36 with respect to the axis 24 of combustor 10. Angle 36 may be divergent or convergent with the axis of the combustor, depending on the position of the gas injector arrays 30 with respect to the swirler 22 and the combustor air throat.

The positioning of the gas injector arrays 30 with respect to the swirler 22, and the discharge angle 36 of the holes or slots in the gas injector arrays 30 result in the gas being injected in predetermined locations in the combustion space around the swirler 22. The discharged gas at the predetermined circumferential locations interacts with the combustion air profile to produce a stable flame with fuel rich zones. If circular gas injector orifices 32 are utilized, a sufficient number is required to realize overlapping gas jets and a gas-rich mixture in the region immediately downstream of the gas injector array 30.

Figure 4:
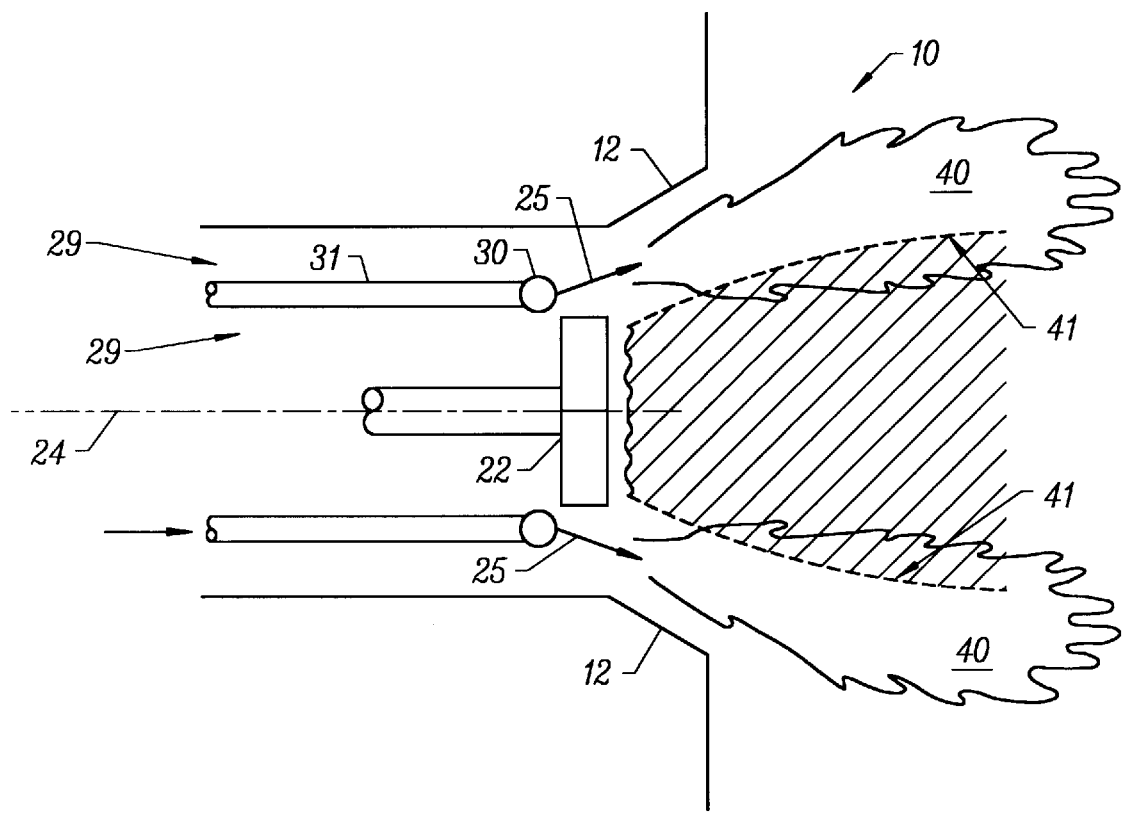
FIG. 4 is a side view of the apparatus of FIG. 1 and the flame that it produces.

FIG. 4 illustrates individual fuel rich flames 40 produced by the combustor 10 of the invention. Each fuel rich flame 40 is selectively produced at or near the edge of the aerodynamic internal recirculation zone 41, thereby promoting gas, air and flue gas mixing, and limiting the quantity of NOx formed in the flame. FIG. 4 also shows the combustion air path with arrows 29. Observe that the gas 25 intersects with the combustion air path 29 at the boundary of the internal recirculation zone 41.

Figure 5:
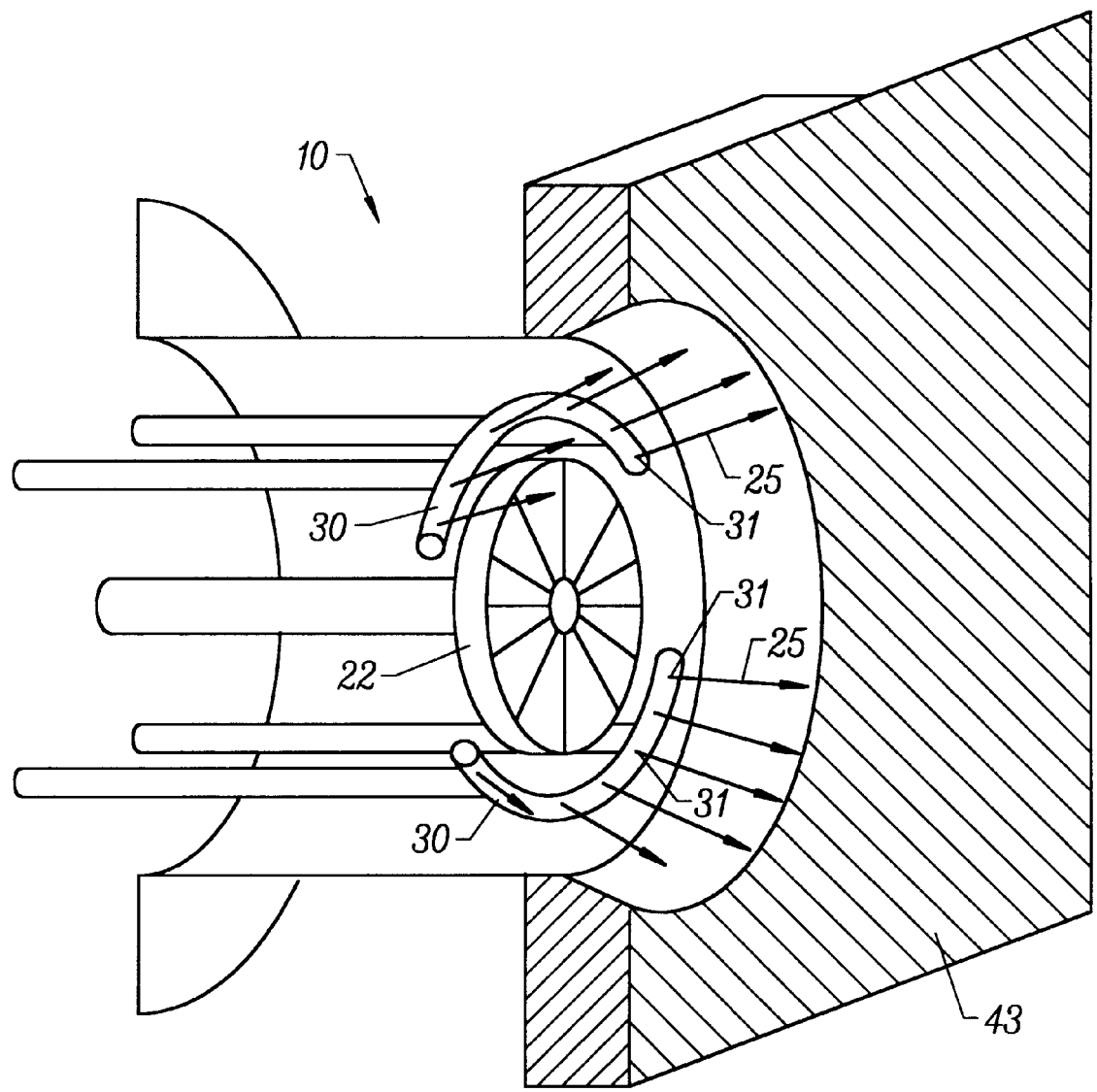
FIG. 5 is a perspective view of the apparatus of FIG. 1 incorporated into a boiler.

FIG. 5 illustrates the combustor 10 of the invention positioned in a boiler wall 43. The figure also illustrates the segmented, arc-shaped stream of gas (shown with arrows 25) achieved in accordance with the technique of the invention. The resultant flame generally corresponds to the shape of the segmented, arc-shaped stream of gas. It can be appreciated from FIG. 5 that the invention is adaptable to most boiler wall configurations, whether a new design or an existing design that is being retrofitted for gas combustion. The modular combustor 10 offers a low-cost installation option for most boilers.

Figure 6:
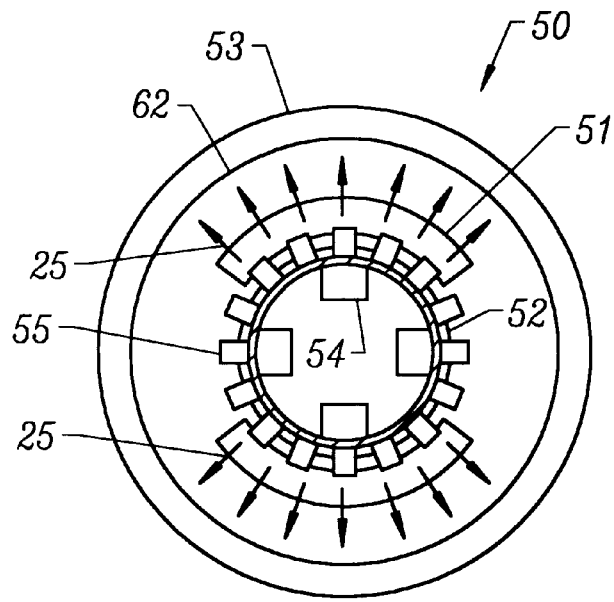
FIG. 6 is an axial view of a low NOx combustion apparatus in accordance with a pulverized coal embodiment of the invention.
Figure 7:
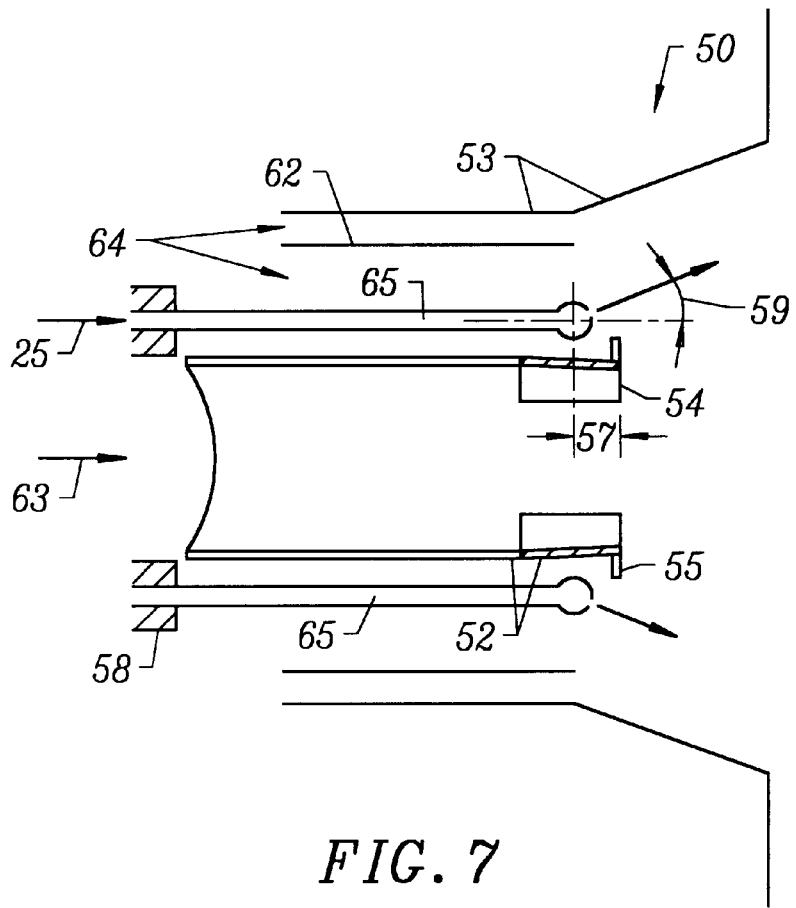
FIG. 7 is a side, cross-sectional view of the apparatus of FIG. 6.
Figure 8:
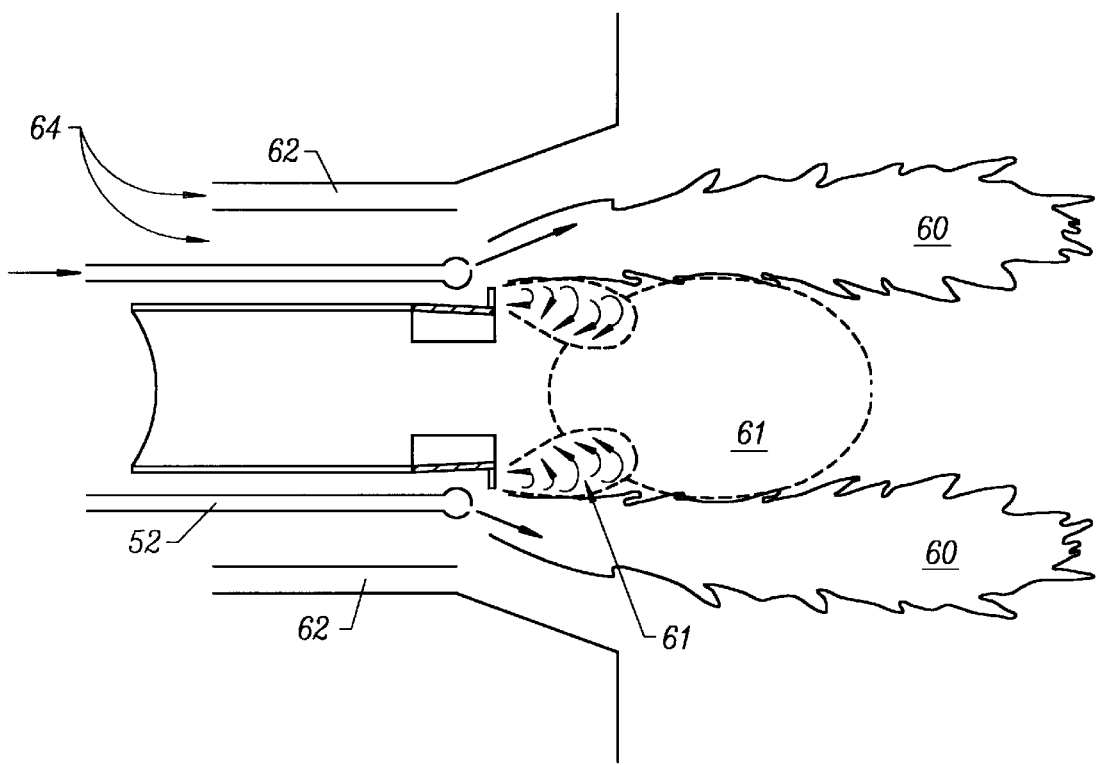
FIG. 8 is a side view of the apparatus of FIG. 6 and the flame that it produces.

The embodiments of FIGS. 1–5 are directed toward a dedicated gas combustor. The invention may also be exploited in connection with a pulverized coal combustor. FIGS. 6–8 illustrate an apparatus that is retrofitted to existing pulverized coal burners or may be incorporated into the design and manufacture of new pulverized coal burners. In the case of the pulverized coal system, the gas injectors inject the gas fuel around the periphery of the pulverized coal injection nozzle in a manner that produces a gas flame with discrete segments, as in the previous embodiment. Flame stabilizer devices that may be a part of the original coal burner may be used to stabilize the gas flame, or new flame stabilizer devices may be installed to replace or augment the original flame stabilizers. The gaseous fuel injections (and possibly the flame stabilizer devices) are positioned axially and radially relative to the end of the coal injection nozzle such that the gas stream intersects with the combustion air path to produce a stable, fuel rich, low-NOx gas flame.

In the previous embodiment of FIGS. 1–5, a circular, vaned flame stabilizer (swirler) is positioned between the gaseous fuel injectors, whereas in the embodiment of FIGS. 6–8, the area between the gaseous fuel injectors is mainly taken up by the pulverized coal injection channel.

FIG. 6 is a front view of a combustor 50 constructed in accordance with a pulverized coal embodiment of the invention. The combustor 50 includes arc-shaped gas injector arrays 51 which are located on a circumference that is located in the annular space bounded by the surface of the coal nozzle 52 and combustor air throat 53. This annular space is the main passageway for combustion air, and may by original design be divided into multiple annular air zones (e.g., by means of cylindrical division plates 62) for purposes of controlling air mixing patterns in the combustor. The gas injector arrays 51 may be located in any of these annular air zones.

There are preferably two gas injector arrays 51 which maybe shaped as arc segments, each extending between 90 and 150 degrees, preferably approximately 120 degrees of the circumference of the combustor 50. Embodiments of the invention also include the use of three arc-shaped gas injector arrays.

The coal nozzle is a conduit, located along the centerline of the combustor, through which a stream of pulverized coal 63 and conveying ("primary") air 64 flows into the furnace. The combustion air path 64 in this embodiment of the invention moves through the annular region surrounding the arc-shaped gas injector arrays 51. In other words, in this embodiment of the invention, the air injection mechanism is the annular region surrounding the arc-shaped gas injector arrays 51.

The geometry of the coal nozzle varies among burner manufacturers and may include internal blockages 54, channels, divergences, vanes or other devices to control the shape and coal distribution in the coal/air stream discharging from the nozzle. Generally, pulverized coal will not be flowing through the coal nozzle when gaseous fuel is being burned.

The coal nozzle 52 may be equipped with flame stabilizers, which may consist of rings, tabs 55, or other devices to create turbulence in the vicinity of the coal nozzle exit. Such devices may be used to stabilize the flame produced from fuel injected from the gas injector arrays 51. Alternatively, these flame stabilizers may be replaced or modified to provide flame stabilization for either gas or pulverized coal flames. New flame stabilizer devices may also be attached to the gas injector arrays 52 or to other combustor components (e.g., division plates 62) to stabilize the gas flame. In general, the design and location of new or modified flame stabilizer devices, if needed to stabilize the gas flame, will be based on site-specific engineering analysis, and therefore may vary from one combustor design to the next.

FIG. 7 is a side view of the combustor 50, showing individual gas injectors 65, coal nozzle 52, and combustor air throat 53. Gas 25 is fed to each gas injector 65 under pressure from a source outside the combustor 50. The gas injectors 65 are separated from the exit plane of the coal nozzle 52 by an axial distance 57 that is optimized for mixing of fuel and air. Preferably, the structure is configured to provide for adjusting this axial distance by independently moving the individual gas injectors 65, for example, by mounting the gas injectors through sleeves 58, which may be locked in place after the optimal position is established.

The holes or slots of the individual injectors 65 are aimed to direct the gas at an angle 59 with respect to the axis of the combustor 50. Angle 59 may be divergent or convergent with the axis of the combustor, depending on the position of the gas injectors 65 with respect to the flame stabilizers 55, coal nozzle 52, and air zone dividers 62.

The positioning of the gas injector nozzles 65, and the discharge angle 59 of the holes or slots in the gas injector nozzles 65 result in the gas being injected in predetermined locations in the combustion space around coal nozzle 52. The discharge gas at the predetermined circumferential locations interacts with the combustion air profile to produce a stable flame with fuel rich zones.

FIG. 8 illustrates the separate fuel rich flames 60 produced by the pulverized coal combustor 50 of the invention. Each fuel rich flame is selectively produced at or near the edge of the aerodynamic internal recirculation zone 61, thereby promoting gas, air, and flue gas mixing, and limiting the quantity of NOx formed in the flame.

In some circumstances simultaneous burning of gaseous fuel and pulverized coal may occur simultaneously in the combustor 50 constructed in accordance with an embodiment of the invention. However, in preferable embodiments, the burning of gaseous fuel occurs without simultaneously burning pulverized coal in the same combustor. That is, there will generally be no flow through the coal nozzle 52 when the gas nozzles 65 are operating, except for possible leakage air or purge air flowing through the coal nozzle. In certain embodiments of the invention, individual combustors in a furnace are operated with gaseous fuel, while others are simultaneously operated with pulverized coal.

Figure 9:
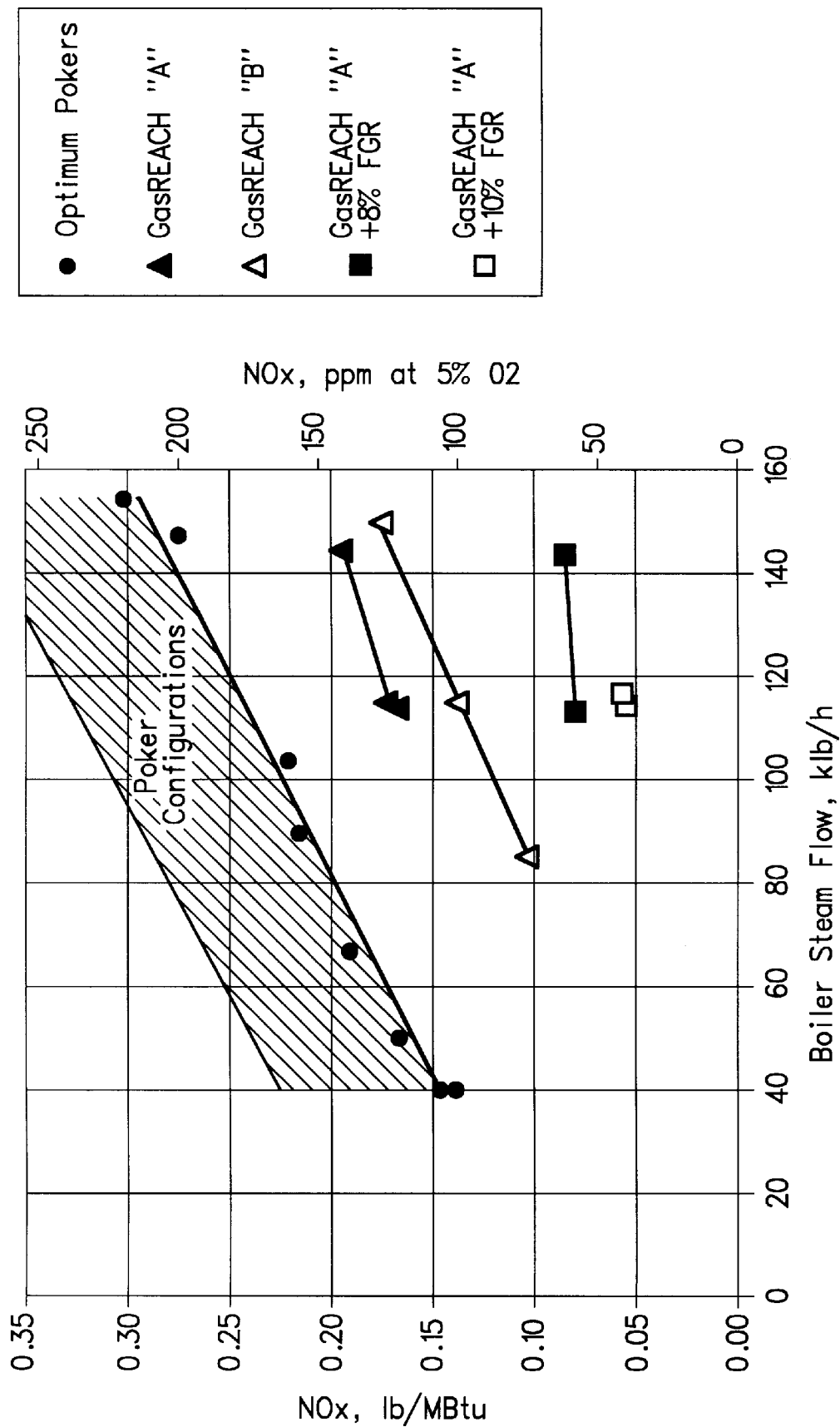
FIG. 9 illustrates NOx reduction performance achieved in accordance with the invention.

The apparatus of the invention has now been fully disclosed. Attention presently turns to performance results achieved in accordance with the invention. FIG. 9 illustrates the NOx emissions achieved with conventional gas injectors, which are referred to as "Optimum Pokers". The figure also shows measured emissions for two embodiments of the invention. The first embodiment, referred to as Gas-REACH "A", is directed toward the slotted gas injector orifice configuration of FIG. 3, while the second embodiment, referred to as GasREACH "B", is directed toward the circular gas injector orifice configuration of FIG. 1. The figure also illustrates results achieved with a combination of the slotted configuration (GasREACH "A") with different levels of Flue Gas Recirculation (FGR) (i.e., 8% FGR and 10% FGR). The results were obtained with two burners firing at low excess $O_2$ levels (typically 1.5 to 2.5% $O_2$ at high load).

The band shown in the upper part of the plot represents the lower rate in NOx emissions for conventional gas injector arrangements. Since highest NOx configurations were not tested with 2-burners operating, the upper reaches of the band are not well defined. However, based on a factor of 2 variation in NOx emissions measured during screening tests of conventional configurations with one burner operating, the NOx band for conventional nozzles with 2-burner operation is expected to extend to much higher NOx levels than indicated in FIG. 9.

The results for the apparatus of the invention as shown in FIG. 1 represent a 30 to 40% NOx reduction from the optimized conventional gas injectors (bottom of the upper band). A more realistic projection of NOx reductions for full-scale applications is obtained if the middle of the upper band is used as an uncontrolled reference condition. This way, an attempt is made to account for the wide range in gas injector designs and burner designs encountered at utility boilers, and the variability in NOx emissions that are evident in continuous emissions monitor data at a given boiler. Using this approach, NOx reductions of 45 to 50% are achieved with the invention.

Windbox Flue Gas Recirculation (FGR) rates of up to 10% were tested in combination with the slotted configuration of FIG. 3. The combined effects of this structure and 10% FGR produced NOx reductions of over 80%. The results are indicative of the NOx reduction potential of the invention with Induced Flue Gas Recirculation (IFGR), and are comparable to NOx reductions achieved with other, higher-cost NOx control options.

Figure 10:
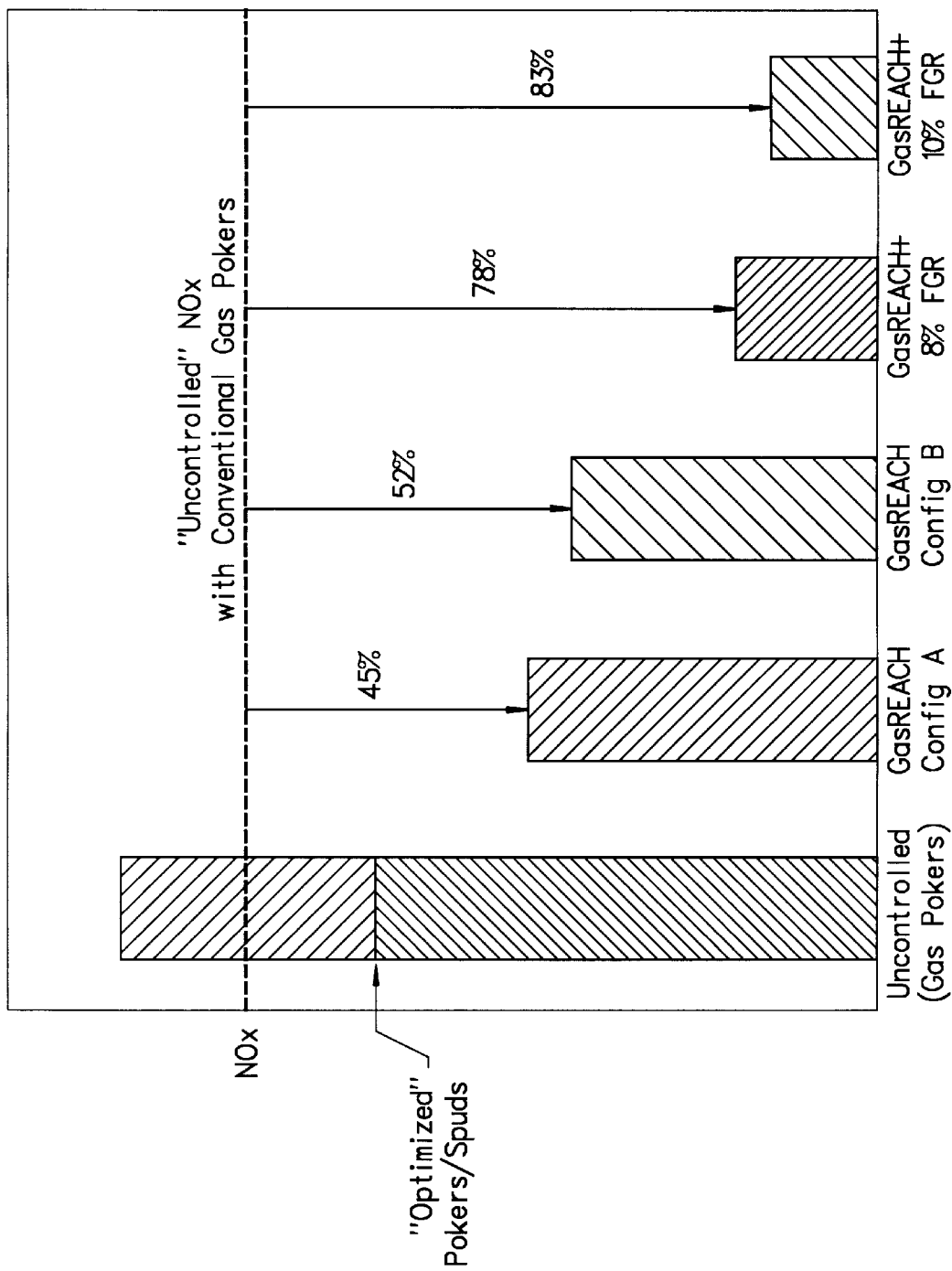
FIG. 10 illustrates percentile NOx reduction performance achieved in accordance with the invention.

The percentage NOx reductions for the invention with and without FGR are summarized in FIG. 10. The reference to "Optimized Pokers/Spuds" refers to individual gas injectors with a non-optimized design.

Those skilled in the art will appreciate that many alternate embodiments incorporating the concepts of the invention are feasible. For example, the gas injector array 30 may be in a linear shape, but the gas injectors may be configured to emit an arc shaped stream of gas of the type emitted with the arc-shaped gas injector arrays.

The foregoing description, for purposes of explanation, used specific nomenclature to provide a thorough understanding of the invention. However, it will be apparent to one skilled in the art that the specific details are not required in order to practice the invention. In other instances, well known devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A combustor, comprising:
   an air injection mechanism to create a combustion air path;
   a flame stabilizing mechanism to create an aerodynamic flow pattern having an internal recirculation zone; and
   a set of arc-shaped gas injector arrays, each arc-shaped gas injector array comprising a cluster of gas injection orifices radially spaced at a first distance from one another about a central burner axis of said combustor, where said arc-shaped gas injector arrays are radially spaced at a second distance from one another about said central burner axis, where said second distance is substantially greater than said first distance, each arc-shaped injector array injecting an arc-shaped stream of gas that intersects with said combustion air path at the boundary of said internal recirculation zone to produce a fuel rich flame segment that is separated from an adjacent fuel rich flame segment, created by an adjacent arc-shaped gas injector arrays by an air rich zone, an interaction between said fuel rich flame segment and said air rich zone resulting in low NOx combustion of said gas.

2. The combustor of claim 1 wherein said air flame stabilizing mechanism is a swirler positioned inside the perimeter of an annular area formed by said set of arc-shaped gas injector arrays.

3. The combustor of claim 1 wherein said air injection mechanism is an annular combustion air channel positioned outside of the perimeter of an annular area formed by said set of arc-shaped gas injector arrays.

4. The combustor of claim 3 further comprising a pulverized coal injection channel positioned within said perimeter of said annular area formed by said set of arc-shaped gas injector arrays, said pulverized coal injection channel including outer periphery tabs that constitute a flame stabilizing mechanism.

5. The combustor of claim 1 wherein each arc-shaped gas injector array extends approximately 90 to 150 degrees of an arcuous path about said central burner axis.

6. The combustor of claim 1 wherein each arc-shaped gas injector array of said set of arc-shaped gas injector arrays includes individual gas injector orifices arranged in a circular configuration about said central burner axis.

7. The combustor of claim 1 wherein each arc-shaped gas injector array of said set of arc-shaped gas injector arrays includes individual gas injector orifices in a slotted configuration.

8. The combustor of claim 1 wherein each arc-shaped gas injector array of said set of arc-shaped gas injector arrays includes individual gas injectors adapted for axial adjustment with respect to said combustion air path.

9. A method of combusting gas, said method comprising the steps of:
   creating a combustion air path at a combustion point; and
   injecting multiple arc-shaped streams of gas that alternate with substantially gas free zones around a circumference of a circle formed about a central burner axis, where each of said multiple arc-shaped streams of gas intersects with said combustion air path at said combustion point to produce a fuel rich flame segment bordered by air rich zones, an interaction between said fuel rich flame segment and said air rich zones resulting in low NOx combustion of said gas.

10. The method of claim 9 wherein said creating step includes the step of creating a combustion air path with a swirler.

11. The method of claim 9 wherein said creating step includes the step of creating a combustion air path with an annular combustion air channel.

12. The method of claim 9 further comprising the step of injecting pulverized coal into said combustion point.

13. The method of claim 9 wherein said injecting step includes the step of injecting an arc-shaped stream of gas with individual gas injector nozzles arranged in a circular configuration about said central burner axis.

14. The method of claim 9 wherein said injecting step includes the step of injecting an arc-shaped stream of gas with individual gas injector nozzles in a slotted configuration.

15. The method of claim 9 further comprising the step of adjusting the injection point of said arc-shaped stream of gas with respect to said combustion point.

* * * * *